Jan. 6, 1959

R. P. ALER 2,867,025

INTERLOCK FASTENER

Filed March 9, 1954

Richard P. Aler
INVENTOR.

BY Clarence A. O'Brien
and Harvey B. Jacobson
Attorneys

United States Patent Office 2,867,025
Patented Jan. 6, 1959

2,867,025

INTERLOCK FASTENER

Richard P. Aler, Baltimore, Md.

Application March 9, 1954, Serial No. 415,035

5 Claims. (Cl. 24—221)

This invention relates in general to improvements in fasteners, and more specifically to an improved interlock fastener.

The primary object of this invention is to provide an interlock fastener which is formed of two fastener members having portions thereof rotatable so as to be internested and resistant to direct pulling apart, the fastener members being identical.

Another object of this invention is to provide an improved interlock fastener which is so designed whereby the individual parts thereof may be quickly and easily made by either a casting or injection process so that the manufacture thereof is economically feasible.

Another object of this invention is to provide an improved fastener which includes interlocked parts, the parts being retained in interlocked relation by interengaged serrations, the serrations being so disposed whereby they become interlocked only when the fasteners are in completely engaged positions.

Still another object of this invention is to provide an improved interlock fastener which is of such a construction whereby it may be quickly and easily attached to articles to be connected so that a minimum of time and effort is involved in the placing of the fastener.

A further object of this invention is to provide an improved interlock fastener which may be secured to various articles to be connected, the interlock fastener being of such a nature whereby the articles to be connected may be connected by merely rotating one of the articles to a small angle with respect to the other after the parts of the fasteners have been initially positioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
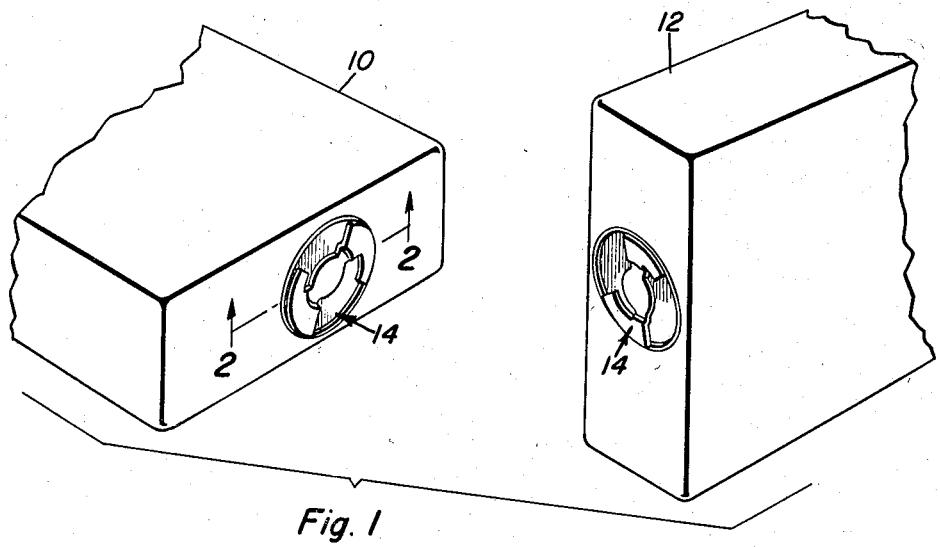
Figure 1 is an exploded perspective view of portions of boxes intended to be connected, the boxes being disposed at a 90° angle to each other prior to their connection through the use of the interlock fastener which is the subject of this invention, opposed ends of the boxes being provided with parts of such fasteners.

Referring now to the drawings in detail, it will be seen that there is illustrated in Figure 1 a pair of boxes 10 and 12 which it is intended to connect together so that the boxes appear as a continuation of one another and so that they may be easily handled as a unit. Carried by an end wall of the box 10 is a fastener member which is referred to in general by the reference numeral 14. An identical fastener member 14 is carried by an opposed end wall of the box 12. The two fastener members 14 combine to form the interlock fastener which is the subject of this invention.

Figure 2:
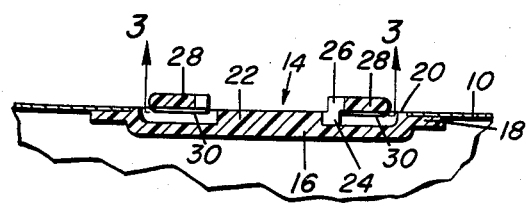
Figure 2 is an enlarged fragmentary sectional view taken substantially upon the plane indicated by the section line 2—2 of Figure 1 and shows the relationship of the interlock fastener with respect to one of the boxes.
Figure 3:
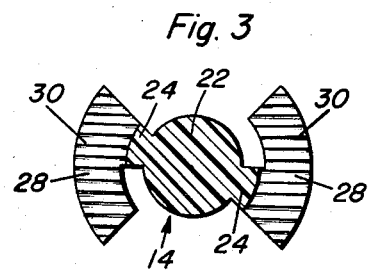
Figure 3 is an enlarged sectional view taken substantially upon the plane indicated by the section line 3—3 of Figure 2 and shows the principal features of the interlock fastener.
Figure 4:
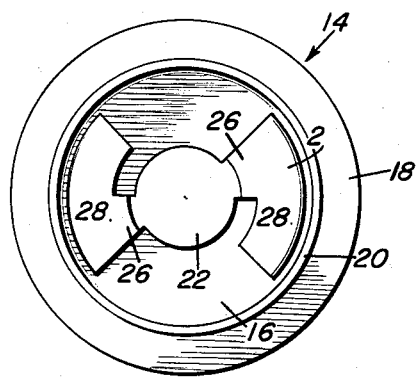
Figure 4 is a plan view of one fastener member of the interlock fastener and shows the general outline thereof.

Referring now to Figures 2, 3 and 4 in detail, it will be seen that the interlock fastener 14 includes a circular support 16. The support 16 has an outer annular portion 18 which is disposed in abutment with the inner surface of a wall of the box 10. In order to assure proper positioning of the fastener member 14 with respect to the box 10, the inner part of the annular portion 18 includes a projecting annular rib 20.

The support 16 also includes an integral, upwardly projecting hub portion 22. The hub portion 22 is circular in outline and is disposed at the center of the support 16. The hub portion 22 has an upper surface coplanar with the upper surface of the rib 20.

As is best illustrated in Figure 3, the hub portion 22 is provided with a pair of diametrically opposite tabs or projections 24. Overlying the tabs 24 are inwardly projecting, radiating, diametrically opposite tabs 26 of outwardly directed radially extending wings 28. Although the tabs 24 and 26 have been described as being in overlying relation, it is to be understood that in fact, the tabs 24 and 26 are integral.

It will be noted that the wings 28 are segments of a relatively wide ring. Inasmuch as there are only two wings 28 for each fastener member 14, the wings 28 are slightly less than 90° in extent. To facilitate the interlocking of the wings 28, the wings 28 are coplanar and are of a thickness equal to the distance which the hub portion 24 projects above the main portion of the support 16.

In operation, a pair of fastener members 14 are so arranged that they are rotated 90° relative to each other. The two fastener members are then disposed in overlying relation at which time the wings 28 thereof are in abutting engagement with the opposed surfaces of the support 16 surrounding the hub portion 22 and disposed between the adjacent wings 28 thereof. When the fastener members 14 are so disposed, one of the fastener members 14 is rotated 90° relative to the other fastener member. At this time, the wings 28 of one fastener member 14 are disposed in complete underlying relation with respect to the wings 28 of the other fastener member. Further, the tabs 24 of one fastener member 14 are in edge abutting engagement with the tabs 26 of the other fastener member so as to limit rotation of the fastener members 14 relative to each other.

In order to assure the retention of the fastener members 14 in interlocked relation, the opposed surfaces of the wings 28 are provided with serrations 30. The serrations 30 are in parallel relation, as is best illustrated in Figure 3. Due to the parallel relation of the serrations 30, when the fastener members 14 are being interlocked, the serrations 30 will slide over each other until such time as the wings 28 are in complete alignment, at which time the serrations 30 will be completely engaged and interlocked so as to prevent accidental rotation of one fastener member 14 with respect to the other.

As is best illustrated in Figure 2, it will be noted that the edges of the wings 28 are rounded. This is to facilitate the initial interengagement of the wings 28 of one fastener member 14 with the other of the fastener members 14.

It is one of the primary intended uses of the interlock fastener which is the subject of this invention to interlock small boxes, such as frozen food boxes. Through the use of the interlock fastener, a quantity of relatively small frozen food boxes may be interconnected into a single unit so that they may be conveniently handled. This will readily facilitate the initial freezing operation, the fast shipment of the boxes of frozen food and the merchandising thereof. Further, it will readily facilitate the movement of boxes of frozen foods in and out of deep freeze units. When the fastener members 14 are intended to be secured to boxes intended for the packaging of frozen foods, it is preferred that the annular portion 18 be secured to the boxes through the use of a suitable adhesive. However, it is to be understood that other fastening means may be utilized to secure the annular portion 18 to the boxes.

Figure 5:
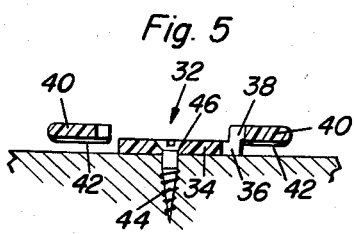
Figure 5 is an enlarged transverse sectional view taken through the center of modified form of interlock fastener and shows the manner in which it is connected to a supporting article.

Referring now to Figure 5 in particular, it will be seen that there is illustrated a modified form of fastener member which is referred to in general by the reference numeral 32. The fastener member 32 differs from the fastener member 14 only in that the support thereof consists entirely of a central hub 34 which is of a circular outline. The central hub 34 is identical in outline to the hub portion 22 and includes diametrically opposed, outwardly extending tabs 36 which underlie inwardly projecting tabs 38 of wings 40. The wings 40 have the surfaces thereof facing the plane of the hub 34 provided with serrations 42. It is to be understood that the bottom plan view of the fastener member 32, as viewed in Figure 5, would be identical to the sectional view of the fastener 14 illustrated in Figure 3, with the exception that the central hub would not be shown in cross-section.

It is intended that the fastener member 32 be secured to a wall or other relatively solid member through the use of a fastener such as a screw 44. The screw 44 will have a head 46 thereof countersunk within the central hub 34. A pair of fastener members 32 may be utilized or a fastener member 32 may be utilized in combination with a fastener member 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An interlock fastener comprising a pair of identical fastener members disposed in internested relation, each of said fastener members including a central hub, and at least one pair of identical radiating wings, each of said wings lying in a common plane offset from the plane of said hub, a tab connecting each wing with said hub, said tab being completely disposed inwardly of its associated wing, an upper surface of said hub being coplanar with a lower surface of said wings, wings of one of said fastener members completely underlying the wings of the other of said fastener member and said hubs being coplanar with wings of the opposite ones of said fastener members each of the underlying portions of the wings including relatively parallel serrations in mating engagement with each other.

2. An interlock fastener comprising a pair of identical fastener members disposed in internested relation, each of said fastener members including a central hub, and at least one pair of identical radiating wings, said wings lying in a common plane offset from the plane of said hub, a tab connecting each wing with said hub, said tab being completely disposed inwardly of its associated wing, opposed surfaces of said wings being provided with interlocked projections and depressions, said projections and depressions being in the form of relatively parallel serrations, said serrations being interlocked only when said wings are in complete overlying relation.

3. An interlock fastener comprising a pair of identical fastener members disposed in internested relation, each of said fastener members including a central hub, and at least one pair of identical radiating wings carried by said hub, each of said wings lying in a common plane offset from the plane of said hub, an upper surface of said hub being coplanar with a lower surface of said wings, wings of one of said fastener members completely underlying the wings of the other of said fastener member and said hubs being coplanar with wings of the opposite ones of said fastener members, said wings each being provided with an inwardly directed projection extending from an edge thereof, said hub being provided with radially outwardly directed projections, said projections being in abutting relation to limit rotation of said one fastener member relative to said other fastener member each of the underlying portions of the wings including relatively parallel serrations in mating engagement.

4. An interlocked fastener comprising a pair of identical fastener members disposed in internested relation, each of said fastener members including a support, identical spaced radiating wings carried by said support, each of said wings being planar and lying in a plane offset from said support, wings of one of said fastener members completely overlying wings of the other of said fastener members, radiating tabs on said support and said wings, said tabs being in overlying connected relation to connect said wings to respective supports, tabs carried by the support of said one fastener member being in abutting engagement with tabs of the wings of said other fastener member to limit rotation of said fastener members relative to each other each of the overlying portions of the wings including relatively parallel serrations in mating engagement.

5. An interlocked fastener comprising a pair of identical fastener members disposed in internested relation, each of said fastener members including a support, identical spaced radiating wings carried by said support, each of said wings being planar and lying in a plane offset from said support, wings of one of said fastener members completely overlying wings of the other of said fastener members, interlock serrations on opposed surfaces of said wings, said serrations being in spaced relatively parallel relation and interlocked only when said wings are in complete overlying relation, radiating tabs on said support and said wings, said tabs being in overlying connected relation to connect said wings to respective supports, said tabs being completely disposed inwardly of said wings.

References Cited in the file of this patent

UNITED STATES PATENTS

| | | |
|---|---|---|
| 423,853 | Belisle | Mar. 18, 1890 |
| 447,821 | Griswold | Mar. 10, 1891 |
| 828,019 | Cronin | Aug. 7, 1906 |
| 1,109,016 | Quin | Sept. 1, 1914 |
| 1,275,533 | Cooper | Aug. 13, 1918 |
| 1,493,365 | Meas | May 6, 1924 |
| 2,291,975 | Minero | Aug. 4, 1942 |
| 2,541,526 | Lundquist | Feb. 13, 1951 |
| 2,626,773 | Backman | Jan. 27, 1953 |

FOREIGN PATENTS

| | | |
|---|---|---|
| 240,535 | Germany | Nov. 8, 1911 |